US009801360B2

(12) United States Patent
Kirkham (10) Patent No.: US 9,801,360 B2
(45) Date of Patent: Oct. 31, 2017

(54) MAGNETIC ROTATING CLEANING APPARATUSES FOR CLEANING AQUARIUM WALLS

(71) Applicant: Michael Kirkham, Shoreline, WA (US)

(72) Inventor: Michael Kirkham, Shoreline, WA (US)

( * ) Notice: Subject to any disclaimer, the term of this patent is extended or adjusted under 35 U.S.C. 154(b) by 0 days.

(21) Appl. No.: 14/748,021

(22) Filed: Jun. 23, 2015

(65) Prior Publication Data

US 2015/0289487 A1  Oct. 15, 2015

Related U.S. Application Data

(63) Continuation-in-part of application No. 14/081,574, filed on Nov. 15, 2013, now abandoned.

(51) Int. Cl.
*A01K 61/00* (2017.01)
*A47L 1/09* (2006.01)
*A01K 63/10* (2017.01)

(52) U.S. Cl.
CPC ............ *A01K 61/003* (2013.01); *A01K 63/10* (2017.01); *A47L 1/09* (2013.01)

(58) Field of Classification Search
CPC . A01K 61/003; A47L 1/09; A47L 1/02; A47L 1/12; A47L 1/13; B08B 1/00
See application file for complete search history.

(56) References Cited

U.S. PATENT DOCUMENTS 3,778,173 A * 12/1973 De Carlo .................. A47L 1/13
 15/220.1
7,725,977 B2 * 6/2010 Remer ................. A01K 61/003
 15/103

* cited by examiner

*Primary Examiner* — Shay Karls
(74) *Attorney, Agent, or Firm* — Mohr Intellectual Property Law Solutions, PC (57) ABSTRACT

Magnetic rotating cleaning apparatuses for cleaning of aquarium walls are shown and described. Each of the cleaning apparatuses includes a first magnetic assembly disposed on an outer surface of the aquarium wall, the first magnetic assembly having an anti-friction pad fixedly attached to a first end of the first magnetic assembly, and a second magnetic assembly disposed on an inner surface of the aquarium wall, the second magnetic assembly magnetically paired to the first magnetic assembly, the second magnetic assembly having a scouring pad fixedly attached to a surface of the second magnetic assembly, the scouring pad making surface-to-surface contact with the inner surface of the aquarium wall. Rotation of a rotation mechanism drives rotation of the first magnetic assembly, rotation of the first magnetic assembly causing synchronistic rotation of the second magnetic assembly. In some examples, the scouring pad has at least one opening configured to reduce surface-to-surface contact between the scouring pad and the inner surface of the aquarium wall, and to collect debris from the inner surface of the aquarium wall and reduce friction during rotation.

19 Claims, 6 Drawing Sheets

MAGNETIC ROTATING CLEANING APPARATUSES FOR CLEANING AQUARIUM WALLS

CROSS REFERENCE TO RELATED APPLICATIONS

This application claims priority to copending U.S. patent application Ser. No. 14/081,574, filed on Nov. 15, 2013, which is hereby incorporated by reference for all purposes.

BACKGROUND

The present disclosure relates generally to apparatuses for cleaning aquarium walls. In particular, magnetic rotating cleaning apparatuses for cleaning aquarium walls are described.

Known aquarium cleaning devices are not entirely satisfactory for the range of applications in which they are employed. For example, existing magnetic cleaning devices include two magnetically paired structures with inner and outer surface cleaning pads in surface-to-surface contact with the inner and outer surfaces of an aquarium wall, respectively. The outer magnetic pair is moved by hand over the outer surface of the aquarium wall. Concurrently, the inner magnetic pair is slid over the inner surface of the aquarium wall. The back and forth hand powered movement described above, however, is insufficient for thorough cleaning of the inner surface wall, which often accumulates a sticky and/or thick layer of organic matter and other debris during normal usage. In addition, conventional magnetic cleaning devices lack an internal arrangement of magnetic elements that allows for vigorous movement of the magnetically paired structures.

For example, U.S. Pat. No. 5,988,109 to Rofen (hereinafter referred to as "Rofen") is directed to a magnetically paired cleaning device for an aquarium wall. Rofen describes that magnetic pairs are easily disengaged and therefore a floatation device attached to the inner magnetic pair enables retrieval when magnetic pairing is disrupted. Evidently, vigorous and/or rapid movement of magnetically paired cleaning devices sufficient for cleaning of an inner surface of an aquarium wall is problematic. The complete disclosure of the above patent is herein incorporated by reference for all purposes.

Thus, there exists a need for apparatuses for cleaning an aquarium wall that improve upon and advance the design of known devices and methods. Examples of new and useful apparatuses for cleaning an aquarium wall relevant to the needs existing in the field are discussed below.

SUMMARY

The present disclosure is directed to magnetic rotating cleaning apparatuses for cleaning of an aquarium wall. Each of the cleaning apparatuses includes a first magnetic assembly disposed on an outer surface of the aquarium wall, the first magnetic assembly having an anti-friction pad fixedly attached to a first end of the first magnetic assembly, the anti-friction pad making surface-to-surface contact with the outer surface of the aquarium wall, and a second magnetic assembly disposed on an inner surface of the aquarium wall, the second magnetic assembly magnetically paired to the first magnetic assembly, the second magnetic assembly having a scouring pad fixedly attached to a surface of the second magnetic assembly, the scouring pad making surface-to-surface contact with the inner surface of the aquarium wall. Rotation of a rotation mechanism driving rotation of the first magnetic assembly, rotation of the first magnetic assembly causing synchronistic rotation of the second magnetic assembly. In some examples, the scouring pad has at least one opening defining at least one space, the at least one opening configured to reduce surface-to-surface contact between the scouring pad and the inner surface of the aquarium wall, the at least one space configured to collect debris from the inner surface of the aquarium wall and reduce friction during rotation.

DETAILED DESCRIPTION

The disclosed magnetic rotating cleaning apparatuses will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various magnetic rotating cleaning apparatuses are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-6, a first example of a magnetic rotating cleaning apparatus, magnetic rotating cleaning apparatus 10, will now be described. Magnetic rotating cleaning apparatus 10 includes a first magnetic assembly 12, a second magnetic assembly 14, a rotation mechanism 16, and a coupling mechanism 18. First magnetic assembly 12 and second magnetic assembly 14 are magnetically paired and an aquarium wall 20 is disposed between the first and second magnetic assemblies. Rotation mechanism 16 is coupled to first magnetic assembly 12 via coupling mechanism 18.

Figure 1:
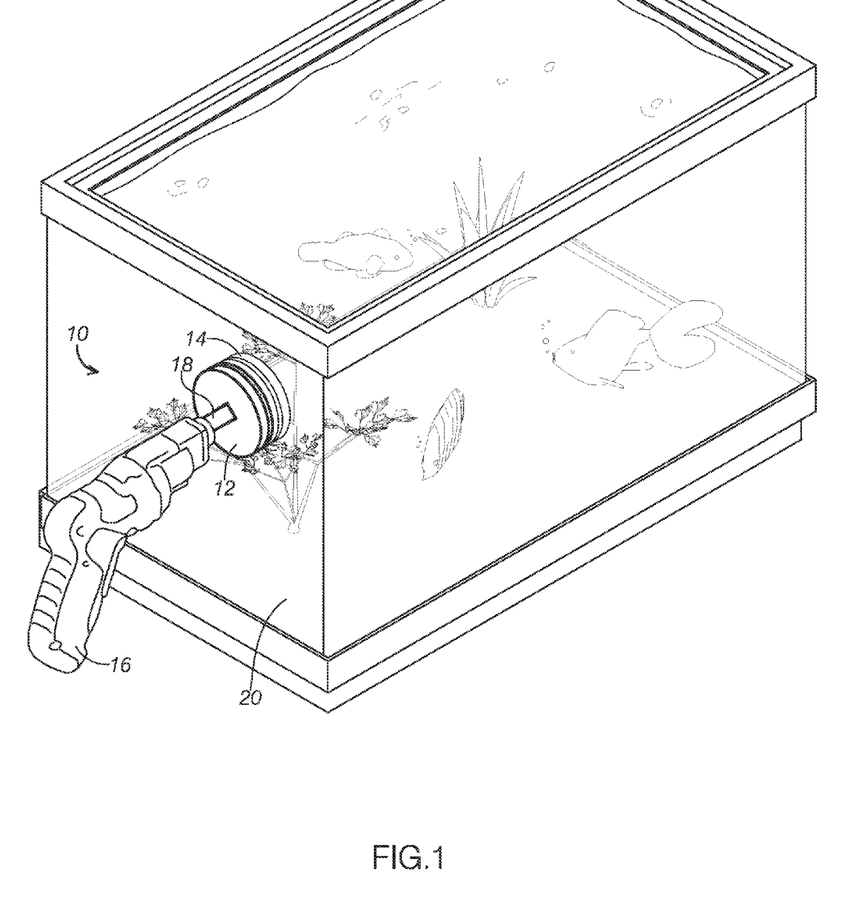
FIG. 1 is a perspective view of a first example of a magnetic rotating cleaning apparatus for cleaning an aquarium wall.
Figure 2:
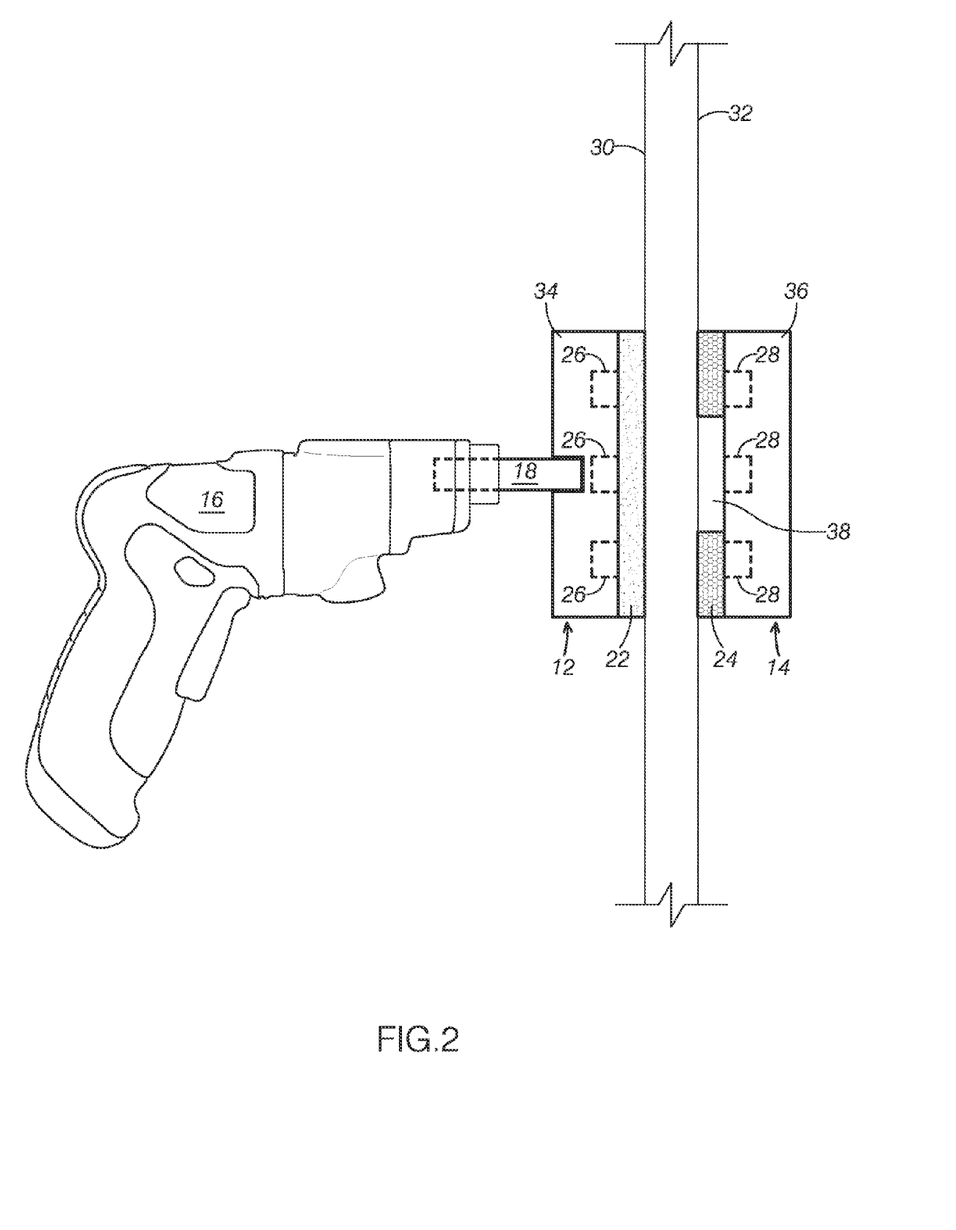
FIG. 2 is a cross-sectional view of the magnetic rotating cleaning apparatus shown in FIG. 1 depicting magnetic pairing between a first magnetic assembly and a second magnetic assembly.

The first magnetic assembly has an anti-friction pad 22 fixedly attached to one end so that the anti-friction pad contacts an outer aquarium wall surface 30. The anti-friction pad can be a soft and/or finely grained material that is suitable for reducing friction between the first magnetic assembly and the aquarium wall during rotation. Further, the anti-friction pad can include one or more openings that are configured to provide one or more open spaces between the first magnetic assembly and the aquarium wall. The one or more openings decrease the surface area of the anti-friction pad which makes surface-to-surface contact with the aquarium wall, thereby further reducing friction and/or heat during operation of the magnetic rotating cleaning apparatus. Furthermore, the one or more spaces collect surface debris and/or acrylic particles that can accumulate during operation of the magnetic rotating cleaning apparatus and potentially increase friction.

The second magnetic assembly has a scouring pad 24 fixedly attached to one end so that the scouring pad contacts an inner aquarium wall surface 32. The scouring pad can be made of a rougher and/or more porous material than the material comprising the anti-friction pad. In other words, the scouring pad is more abrasive than the anti-friction pad.

Functionally, the rotation mechanism drives rotation of the coupling mechanism and rotation of the coupling mechanism drives rotation of the first magnetic assembly. Because the first magnetic assembly is magnetically paired to the second magnetic assembly, rotation of the first magnetic assembly causes synchronistic rotation of the second magnetic assembly.

The scouring pad is then rotated at a high speed (a speed greater than rotation by hand) over the inner surface of the aquarium wall. Thus, magnetic rotating cleaning apparatus 10 functions to more effectively remove organic matter and/or other debris from the inner surface of the aquarium wall than known aquarium cleaning devices. Additionally or alternatively, the magnetic rotating cleaning apparatus can be used to clean the outer surface of the aquarium wall via rotation of the anti-friction pad across the outer surface.

Figure 7:
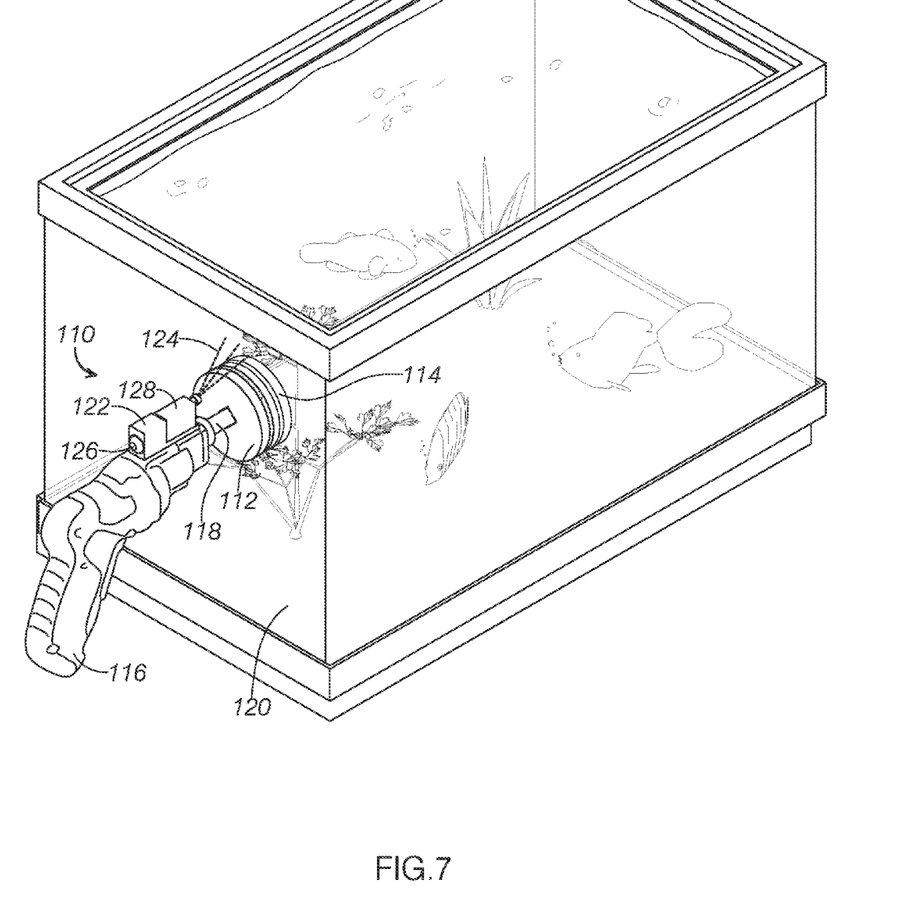
FIG. 7 is a perspective view of a second example of a magnetic rotating cleaning apparatus including a lubricant spray mechanism.

In a second example, shown in FIG. 7, a magnetic rotating cleaning apparatus 110 additionally includes a lubricant spray mechanism 122. The lubricating spray mechanism is configured to spray a lubricating liquid onto the outer surface of the aquarium wall during operation of the rotation mechanism. The lubricating liquid functions to even further reduce friction between the anti-friction pad and the outer surface of the aquarium wall.

As can be seen in FIGS. 1 and 2, first magnetic assembly 12 is disposed on outer surface 30 of aquarium wall 20. First magnetic assembly 12 includes a first assembly main body 34, a plurality of magnetically attractable elements 26, and anti-friction pad 22. In this example, the plurality of magnetically attractable elements are magnets. As shown in FIG. 2, plurality of magnetically attractable elements 26 are arranged in series on a plane that is parallel to aquarium wall 20. Anti-friction pad 22 is disposed between first assembly main body 34 and aquarium wall 20, making surface-to-surface contact with outer aquarium wall surface 30.

Magnetically paired to first magnetic assembly 12 is second magnetic assembly 14. Second magnetic assembly 14 is disposed on inner aquarium wall surface 32. Second magnetic assembly 14 includes a second assembly main body 36, a plurality of magnetically attractable elements 28, and scouring pad 24. In this example, plurality of magnetically attractable elements 28 is a plurality of magnets. Magnetically attractable elements 28 are magnetically attracted to opposing elements in the magnetically attractable elements 26, forming opposing magnetic pairs. Like magnetically attractable elements 26, magnetically attractable elements 28 are arranged in series on a plane that is parallel to aquarium wall 20. Scouring pad 24 is disposed between second assembly main body 36 and aquarium wall 20, making surface-to-surface contact with inner aquarium wall surface 32.

Figure 3:
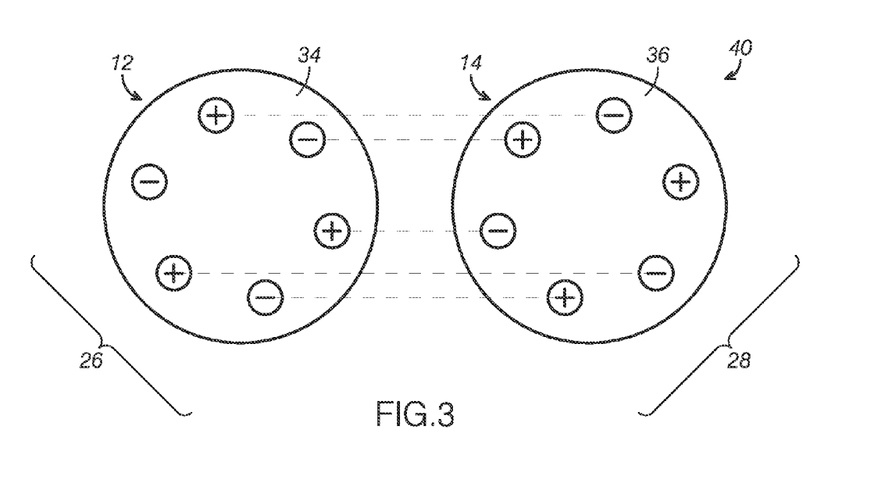
FIG. 3 is a cross-sectional view of a first example of a magnetic arrangement for the magnetically attractable elements of the first and second magnetic assemblies shown in FIGS. 1 and 2.
Figure 4:
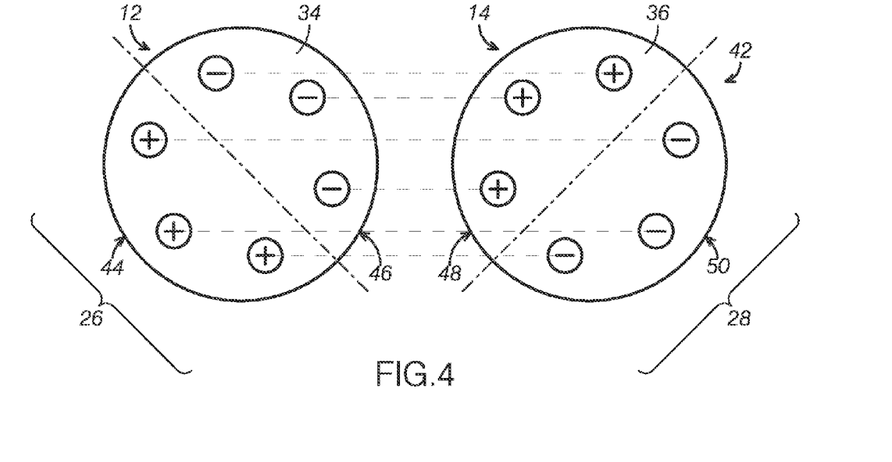
FIG. 4 is a cross-sectional view of a second example of a magnetic arrangement for the magnetically attractable elements of the first and second magnetic assemblies shown in FIGS. 1 and 2.

FIGS. 3 and 4 show exemplary alternative arrangements for magnets (arrangements 40 and 42) within first and second magnetic assemblies 12 and 14. In these examples, the first and second assembly main bodies 34 and 36 are generally cylindrical in shape and therefore have a circular face. Pluralities of magnetically attractable elements 26 and 28 are concentrically arranged around a center of each of first and second assembly main bodies 34 and 36, respectively. Arrangements for magnets 40 and 42 include six magnets in each of the first and second magnetic assemblies, and the magnets are retained in a fixed position within the first and second assembly main bodies.

As shown in FIG. 3, arrangement 40 includes magnets that have either of a positive or negative polarity on a magnetically mating face of the first and second magnetic assemblies. In arrangement 40, adjacent magnets in the pluralities of magnetically attractive elements 26 and 28 are of alternating polarity (e.g. positive, negative, positive . . . ). Further, opposing magnetic pairs in the first and second magnetic assemblies are magnetic pairs and are of opposite polarity. In other words, if a magnet in the first magnetic assembly is positive, then the opposing magnetic pair of the second magnetic assembly is negative. Similarly, if a magnet in the first magnetic assembly is negative, then the opposing magnetic pair of the second magnetic assembly is positive.

As shown in FIG. 4, arrangement 42 includes magnets that have either of a positive or negative polarity on a magnetically mating face of the first and second magnetic assemblies. In arrangement 42, plurality of magnetically attractive elements 26 includes three positive polarity magnets on a first side 44 of first magnetic assembly 12 and three negative polarity magnets on a second side 46 of first magnetic assembly 12. Further, plurality of magnetically attractive elements 28 includes three negative polarity magnets on a first side 48 of second magnetic assembly 14 and three positive polarity magnets on a second side 50 of second magnetic assembly 14. Thus, magnets on first side 44 of first magnetic assembly 12 are magnetically paired to magnets on first side 48 of second magnetic assembly 14, and magnets on the second side 46 of first magnetic assembly 12 are magnetically paired to magnets on the second side 50 of second magnetic assembly 14. Therefore, as in arrangement 40 (of FIG. 3), opposing magnetic pairs in the first and second magnetic assemblies are magnetic pairs and are of opposite polarity.

It will be appreciated that in alternative embodiments the first and second magnetic assemblies may have a different arrangement of magnets (e.g., square arrangement, star arrangement, triangular arrangement, etc.), more or fewer magnets may be included (e.g., 1, 2, 3 . . . 7, 8, 9, etc.), and/or magnets may have different polarities on magnetically mating face of the first and second magnetic assemblies (e.g., all negative, all positive, etc.). In additional alternative embodiments, either of the first or the second plurality of magnetically attractable elements may be a magnetically attractable material or combination of materials that are not magnets (e.g., iron, steel, nickel, and/or other ferromagnetic materials). Further, the main body of either or both of the first and second magnetic assemblies may have other than a cylindrical shape (e.g., triangular prism, hexagonal prism, octagonal prism, etc.).

Returning to FIG. 2, as described above, anti-friction pad 22 is disposed between first assembly main body 34 and aquarium wall 20, making surface-to-surface contact with outer aquarium wall surface 30. In the present example, the anti-friction pad is releasably attached to the first assembly main body via a releasable attachment mechanism, such as hook and eye material (e.g., Velcro®). Further, the anti-friction pad is comprised of a soft and/or finely grained material suitable for reducing friction during rotation of the first magnetic assembly (e.g., felt, wool, acrylic, etc.). In alternate examples, the anti-friction pad can be fixedly adhered to the first assembly main body. The anti-friction pad may be adhered to the first assembly main body by an adhesive (e.g., glue, epoxy, paste, etc.), which is preferably a waterproof adhesive.

FIG. 2 further depicts that scouring pad 24 disposed between second assembly main body 36 and aquarium wall 20, making surface-to-surface contact with inner aquarium wall surface 32. Scouring pad 24 is fixedly adhered to second magnetic assembly 14. The scouring pad may be adhered to the first assembly main body by a waterproof adhesive (e.g., glue, epoxy, paste, etc.). The scouring pad is comprised of a course and/or porous material suitable for scrubbing of the inner aquarium wall during rotation of the second magnetic assembly (e.g., nylon fiber web, polyester fiber web, steel wool, etc.).

The scouring pad can include one or more openings, such as opening 38 shown in FIG. 2. Opening 38 is configured to decrease the surface area of the anti-friction pad in contact with the aquarium wall. During operation of the magnetic rotating cleaning apparatus, heat may accumulate because of friction between the scouring pad and the inner surface of the aquarium. The accumulated heat may damage either or both of the magnetic rotating cleaning apparatus and the inner surface of the aquarium wall, and/or slow down a rate of rotation. Decreasing the surface area of the scouring pad via the one or more openings reduces the amount of friction and heat accumulation during operation.

Further, a space disposed within opening 38 is configured to collect surface debris and/or acrylic particles. Accumulation of debris and/or acrylic particles onto the scouring pad could further increase friction and heat during operation of the magnetic rotating cleaning apparatus. It is therefore advantageous that the majority of debris and/or acrylic particles collect in the space rather than accumulating on the scouring pad.

Figure 5A:
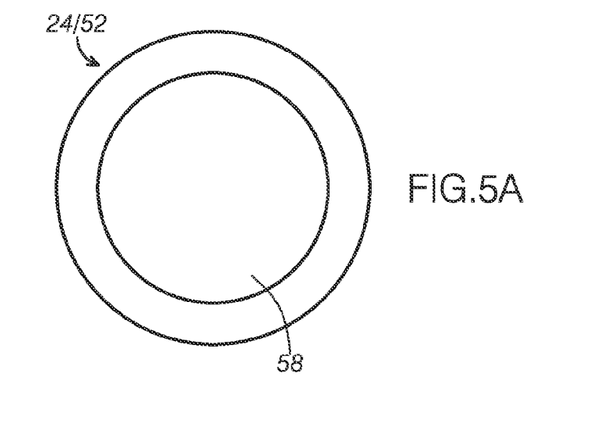
FIGS. 5A-C are front views of first, second, and third examples, respectively, of scouring pads for the magnetic rotating cleaning apparatus shown in FIG. 1.
Figure 5B:
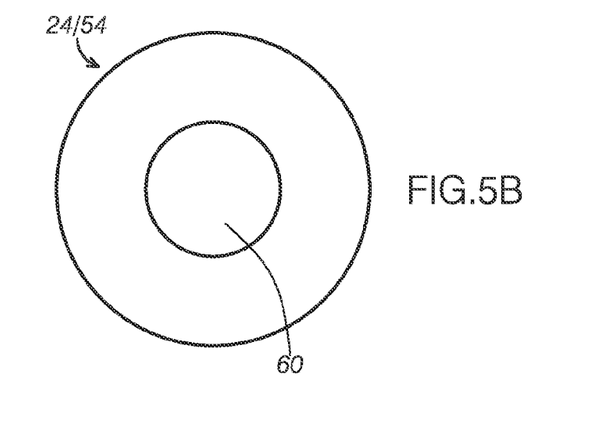
Figure 5C:
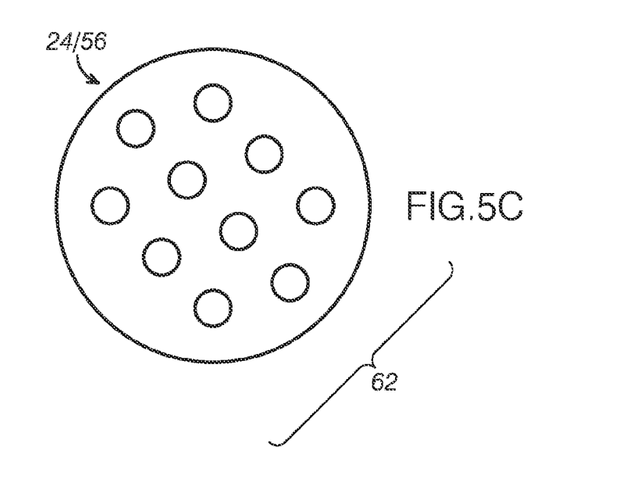

FIGS. 5A-C depicts three alternate embodiments for a scouring pad. FIG. 5A shows a first scouring pad 52 including an opening 58. Opening 58 is a relatively large opening which is 50% or more of the total surface area of the anti-friction pad. The relatively large opening can be 50% to 80% of the total surface area of the anti-friction pad.

FIG. 5B shows a second scouring pad 54 including an opening 60. Opening 60 is a relatively small opening which is less than 50% of the totally surface area of the scouring pad. The relatively small opening can be 20% to 49% of the total surface area of the scouring pad. The relatively smaller opening provides a greater support and cushioning to the first magnetic assembly, while relatively larger opening decreases friction to a greater degree during operation. It will be appreciated that an opening in a scouring pad can be any desirable size.

A third scouring pad 56 includes a plurality of openings 62. In this specific example, plurality of openings 62 includes ten openings with a space disposed within each opening, each of the openings being of a similar size and evenly distributed throughout the scouring pad. It will be appreciated that the plurality of openings may include more or fewer openings, the openings may be of differing sizes, and/or the openings may be unevenly distributed throughout the scouring pad. It will be further appreciated that the anti-slip pat can additionally include openings substantially similar to those described above for the scouring pad.

Figure 6:
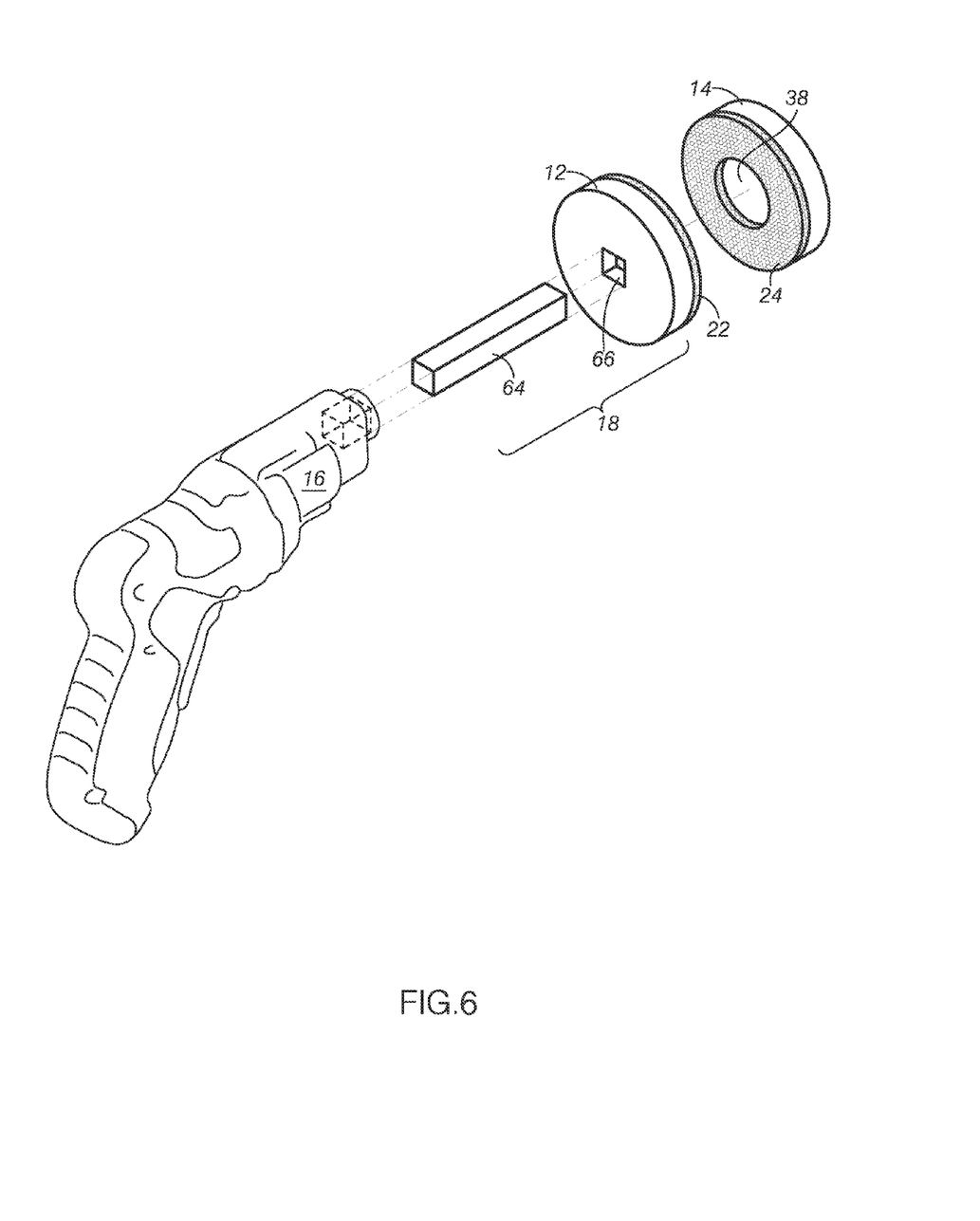
FIG. 6 is an exploded view of a coupling mechanism for the magnetic rotating cleaning apparatus shown in FIG. 1.

Returning again to FIGS. 1 and 2, rotation mechanism 16 is shown coupled to first magnetic assembly 12 via a coupling mechanism 18. In this example, rotation mechanism 16 is an electric drill. FIG. 6 shows an exploded view of rotation mechanism 16, coupling mechanism 18, and first magnetic assembly 12. It will be appreciated that in an alternate embodiment the rotation mechanism may be a hand powered rotation device similarly coupled to the first magnetic assembly.

As depicted in FIG. 6, coupling mechanism 18 includes a drill bit 64 and an opening 66. Drill bit 64 is configured to be selectively matable to rotation mechanism 16 (i.e., an electric drill). Opening 66 is disposed within a side of the first magnetic assembly that faces away from the aquarium wall and is on an opposite side relative to the anti-friction pad. Opening 66 extends into the first assembly main body and is of a complimentary shape to drill bit 64. In the present example, the drill bit and the insertion opening are rectangular cuboidal in shape. In alternate examples, the drill bit and the insertion opening may be of a differing shape (e.g., triangular prism, hexagonal prism, octagonal prism, etc.). It will be appreciated that, in some examples, the drill bit can be permanently attached and/or mounted to the first magnetic assembly, while, in other examples, the drill bit can be selectively matable to the first magnetic assembly via insertion into the opening. It will be appreciated that the drill bit and the opening may be of any desired shape and/or configuration that allows for selective coupling of the rotation mechanism to the first magnetic assembly.

In operation of magnetic rotating cleaning apparatus 10, one end of the drill bit is selectively secured to the drill and an opposite end is inserted into the insertion hole in the first magnetic assembly. Operation of the drill drives rotation of the drill bit, and rotation of the drill bit drives rotation of the first magnetic assembly. As the first magnetic assembly is magnetically paired to the second magnetic assembly, rotation of the first magnetic assembly causes synchronistic rotation/movement of the second magnetic assembly.

Rotational movement of the scouring pad over the inner surface of the aquarium wall effectively removes organic matter and/or debris (i.e., cleans the inner surface of the aquarium wall). The arrangement of the magnetically attractive elements allows for the first and second magnetic assemblies to remain magnetically paired during rotation/movement that occurs while cleaning the aquarium wall. The configuration of the anti-friction pad combined the first magnetic assembly to move substantially smoothly over the aquarium wall without overheating.

Turning attention to FIG. 7, a second example of a magnetic rotating cleaning apparatus 110 will now be described. Magnetic rotating cleaning apparatus 110 includes many similar or identical features to magnetic rotating cleaning apparatus 10. Thus, for the sake of brevity, each feature of magnetic rotating cleaning apparatus 110 will not be redundantly explained. Rather, key distinctions between magnetic rotating cleaning apparatus 110 and magnetic rotating cleaning apparatus 10 will be described in detail and the reader should reference the discussion above for features substantially similar between the two magnetic rotating cleaning apparatuses.

As can be seen in FIG. 7, magnetic rotating cleaning apparatus 110 includes a first magnetic assembly 112, a second magnetic assembly 114, a rotation mechanism 116, and a coupling mechanism 118. First magnetic assembly 112 and second magnetic assembly 114 are magnetically paired and an aquarium wall 120 is disposed between the first and second magnetic assemblies. The first and second magnetic assemblies may include the arrangements and features of magnetically attractive elements described above in reference to first magnetic assembly 12 and second magnetic assembly 14.

The first magnetic assembly has an anti-friction pad (not specifically indicated) fixedly attached so that the anti-friction pad contacts an outer aquarium wall surface. The second magnetic assembly has a scouring pad (not specifically indicated) fixedly attached so that the scouring pad contacts an inner aquarium wall surface. The anti-friction pad and the scouring pad may include any of the features and/or embodiments described above in reference to anti-friction pad 22 and scouring pad 24.

Rotation mechanism 116 is selectively coupled to first magnetic assembly 112 via coupling mechanism 118. Coupling mechanism 118 may include the features described above in reference to coupling mechanism 18. As in the example described above, rotation mechanism 116 is an electric drill, but may alternatively be a hand powered rotation device.

Notably, rotation mechanism 116 includes a lubricant spraying mechanism 122 configured to spray a liquid lubricant 124 onto the outer surface of the aquarium wall 120. Lubricant spray mechanism 122 may be permanently or releasably attached to rotation mechanism 116. Lubricant spray mechanism 122 includes a liquid storage compartment 126 and a pumping mechanism 128. Lubricant spray mechanism 122 can be configured to automatically spray liquid lubricant 124 during operation of the electric drill. Alternatively, the lubricant spray mechanism may be configured to spray liquid lubricant via operation that is independent of operation of the electric drill.

The lubricant spray mechanism is configured to spray liquid lubricant onto the surface of the aquarium wall in the general location of where the first magnetic assembly contacts the aquarium wall. The liquid lubricant is provided to further reduce friction between the anti-friction pad and the aquarium wall during rotation. The liquid lubricant may be any liquid lubricant that can be sprayed through the lubricant spray mechanism and reduce friction between the anti-friction pad and the aquarium wall (e.g., water, diluted soap mixture, diluted viscous mixture, etc.).

In operation of magnetic rotating cleaning apparatus 110, one end of the coupling mechanism is secured to the drill and an opposite end is selectively coupled to the first magnetic assembly. Operation of the drill drives rotation of the coupling mechanism, and rotation of the coupling mechanism drives rotation of the first magnetic assembly. Immediately before or during rotation, the lubricant spray mechanism sprays lubricant onto the outer surface of the aquarium wall generally in an area of where the first magnetic assembly contacts the aquarium wall.

As the first magnetic assembly is magnetically paired to the second magnetic assembly, rotation of the first magnetic assembly causes synchronistic rotation/movement of the second magnetic assembly. Rotational movement of the scouring pad over the inner surface of the aquarium wall effectively removes organic matter and/or debris (i.e., cleans the inner surface of the aquarium wall). The arrangement of the magnetically attractive elements allows for the first and second magnetic assemblies to remain paired during rotation/movement that occurs while cleaning the aquarium wall. The configuration of the anti-friction pad combined with the liquid lubricant allows the first magnetic assembly to move substantially smoothly over the aquarium wall without overheating.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A magnetic rotating cleaning apparatus for cleaning an aquarium wall, comprising:
    a first magnetic assembly configured to be disposed on an outer surface of the aquarium wall, the first magnetic assembly having:
        a first assembly main body,
        one or more first assembly magnetically attractable elements fixedly housed in the first assembly main body,
        an anti-friction pad fixedly attached to a first end of the first magnetic assembly, the anti-friction pad configured to make surface-to-surface contact with the outer surface of the aquarium wall, and
        a first coupling partner disposed on a second end of the first magnetic assembly, the second end on an opposite side of the first magnetic assembly relative to the first end;
    a second magnetic assembly disposed on an inner surface of the aquarium wall, the second magnetic assembly configured to be magnetically paired to the first magnetic assembly, the aquarium wall disposed between the first magnetic assembly and the second magnetic assembly when engaged with the aquarium wall, the second magnetic assembly having:
a second assembly main body,
one or more second assembly magnetically attractable elements fixedly housed in the second assembly main body, and
a scouring pad fixedly attached to a surface of the second magnetic assembly, the scouring pad configure to make surface-to-surface contact with the inner surface of the aquarium wall, and wherein the scouring pad has at least one opening defining at least one space, the at least one opening configured to reduce surface-to-surface contact between the scouring pad and the inner surface of the aquarium wall, the at least one space configured to collect debris from the inner surface of the aquarium wall and reduce friction during rotation; and
a rotation mechanism, the rotation mechanism including a second coupling partner selectively matable to the first coupling partner,
wherein the first coupling partner and the second coupling partner are selectively mated to form a coupling mechanism and the rotation mechanism is configured to drive rotation of the first magnetic assembly, rotation of the first magnetic assembly causing synchronistic rotation of the second magnetic assembly.

2. The magnetic rotating cleaning apparatus of claim 1, wherein the one or more first assembly magnetically attractable elements is one or more first assembly magnets.

3. The magnetic rotating cleaning apparatus of claim 1, wherein the one or more first assembly magnetically attractable elements are one or more first assembly magnets and the one or more second assembly magnetically attractable elements are one or more second assembly magnets, polarities of opposing magnets in the one or more first assembly magnets and the one or more second assembly magnets being magnetic pairs.

4. The magnetic rotating cleaning apparatus of claim 1, wherein the anti-friction pad is a first material and the scouring pad is a second material, the first material being softer and finer grained than the second material.

5. The magnetic rotating cleaning apparatus of claim 1, wherein the at least one opening is a central opening and the at least one space is a centrally located space in the scouring pad.

6. The magnetic rotating cleaning apparatus of claim 5, wherein the at least one opening is in the range of 20% to 49% of a total surface area of the scouring pad.

7. The magnetic rotating cleaning apparatus of claim 5, wherein the centrally located opening is in the range of 50% to 80% of a total surface area of the scouring pad.

8. The magnetic rotating cleaning apparatus of claim 1, wherein the at least one opening is a plurality of openings and the at least one space is a plurality of spaces, each of the plurality of openings defining one of the plurality of spaces.

9. The magnetic rotating cleaning apparatus of claim 8, wherein the plurality of openings are of an equal size and are equally spaced within the scouring pad.

10. The magnetic rotating cleaning apparatus of claim 1, wherein the scouring pad has a plurality of perforations, one of a plurality of spaces disposed within each of the plurality of perforations, the plurality of perforations configured to reduce surface-to-surface contact between the scouring pad and the inner surface of the aquarium wall, the plurality of spaces configured to collect debris from the inner surface of the aquarium wall and reduce friction during rotation.

11. The magnetic rotating cleaning apparatus of claim 1, wherein the rotation mechanism is an electric drill.

12. The magnetic rotating cleaning apparatus of claim 11, wherein the first coupling partner is a drill bit and the electric drill is matable to the drill bit.

13. The magnetic rotating cleaning apparatus of claim 11, further comprising a lubricant spray mechanism, the lubricant spray mechanism releasably mounted to the drill, the lubricant spray mechanism configured to spray a lubricating liquid onto the outer surface of the aquarium wall during operation of the drill.

14. A magnetic rotating cleaning apparatus for cleaning an aquarium wall, comprising:
a first magnetic assembly configured to be disposed on an outer surface of the aquarium wall, the first magnetic assembly having:
a first assembly main body,
one or more first assembly magnetically attractable elements fixedly housed in the first assembly main body, and
an anti-friction pad fixedly attached to a first end of the first magnetic assembly, the anti-friction pad configured to make surface-to-surface contact with the outer surface of the aquarium wall;
a second magnetic assembly disposed on an inner surface of the aquarium wall, the second magnetic assembly magnetically paired to the first magnetic assembly, the aquarium wall disposed between the first magnetic assembly and the second magnetic assembly when engaged with the aquarium wall, the second magnetic assembly having:
a second assembly main body,
one or more second assembly magnetically attractable elements fixedly housed in the second assembly main body, and
a scouring pad fixedly attached to a surface of the second magnetic assembly, the scouring pad configured to make surface-to-surface contact with the inner surface of the aquarium wall, the scouring pad having at least one opening defining at least one space, the at least one opening configured to reduce surface-to-surface contact between the scouring pad and the inner surface of the aquarium wall, the at least one space configured to collect debris from the inner surface of the aquarium wall and reduce friction during rotation; and
wherein rotation of the first magnetic assembly causes synchronistic rotation of the second magnetic assembly.

15. The magnetic rotating cleaning apparatus of claim 14, wherein the at least one opening is a central opening and the at least one space is a centrally located space in the scouring pad.

16. The magnetic rotating cleaning apparatus of claim 14, wherein the at least one opening is a plurality of openings and the at least one space is a plurality of spaces, each of the plurality of openings defining one of the plurality of spaces.

17. The magnetic rotating cleaning apparatus of claim 16, wherein the plurality of openings are of an equal size and are equally spaced within the scouring pad.

18. The magnetic rotating cleaning apparatus of claim 14, further comprising:
a first coupling partner disposed on a second end of the first magnetic assembly, the second end on an opposite side of the first magnetic assembly relative to the first end; and a rotation mechanism, the rotation mechanism including a second coupling partner selectively matable to the first coupling partner, wherein the first coupling partner and the second coupling partner are selectively mated to form a coupling mechanism and the rotation mechanism is configured to drive rotation of the first magnetic assembly, rotation of the first magnetic assembly causing synchronistic rotation of the second magnetic assembly.

19. A magnetic rotating cleaning apparatus for cleaning an aquarium wall, comprising:

a first magnetic assembly configured to be disposed on an outer surface of the aquarium wall, the first magnetic assembly having:
- a first assembly main body,
- a plurality of first assembly magnets fixedly housed in the first assembly main body, the plurality of first assembly magnets concentrically arranged around a center of the first assembly main body, a polarity of the plurality of first assembly magnets alternating between adjacent magnets,
- an anti-friction pad fixedly attached to a first end of the first magnetic assembly, the anti-friction pad configured to make surface-to-surface contact with the outer surface of the aquarium wall, the anti-friction pad being made of a first material, and
- a first coupling partner disposed on a second end of the first magnetic assembly, the second end on an opposite side of the first magnetic assembly relative to the first end;

a second magnetic assembly configured to be disposed on an inner surface of the aquarium wall, the second magnetic assembly magnetically paired to the first magnetic assembly, the second magnetic assembly having:
- a second assembly main body,
- a plurality of second assembly magnets fixedly housed in the second assembly main body, the plurality of second assembly magnets concentrically arranged around a center of the second assembly main body, a polarity of the plurality of second assembly magnets alternating between adjacent magnets, and
- a scouring pad fixedly attached to a surface of the second magnetic assembly, the scouring pad configured to make surface-to-surface contact with the inner surface of the aquarium wall, the scouring pad being made of a second material, the first material being softer and finer grained than the second material, the souring pad having at least one opening defining a space, the at least one opening configured to reduce surface-to-surface contact between the scouring pad and the inner surface of the aquarium wall, the space configured to collect debris from the inner surface of the aquarium wall and reduce friction during rotation; and a rotation mechanism, the rotation mechanism including a second coupling partner selectively matable to the first coupling partner, wherein the first coupling partner and the second coupling partner are selectively mated to form a coupling mechanism and the rotation mechanism is configured to drive rotation of the first magnetic assembly, rotation of the first magnetic assembly causing synchronistic rotation of the second magnetic assembly.

* * * * *